Jan. 22, 1952     I. WOLFF     2,583,503
POSITION DETERMINING SYSTEM
Filed Dec. 29, 1945     3 Sheets-Sheet 1
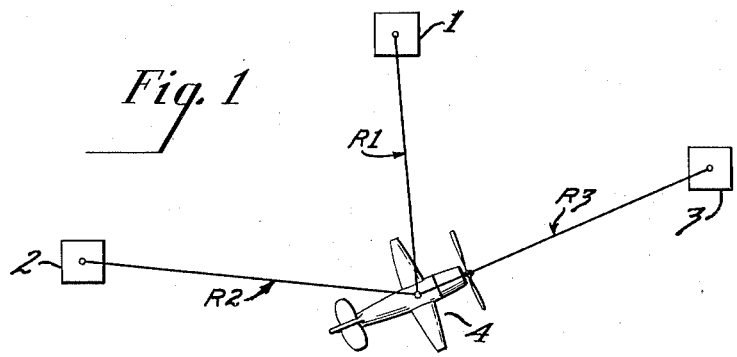
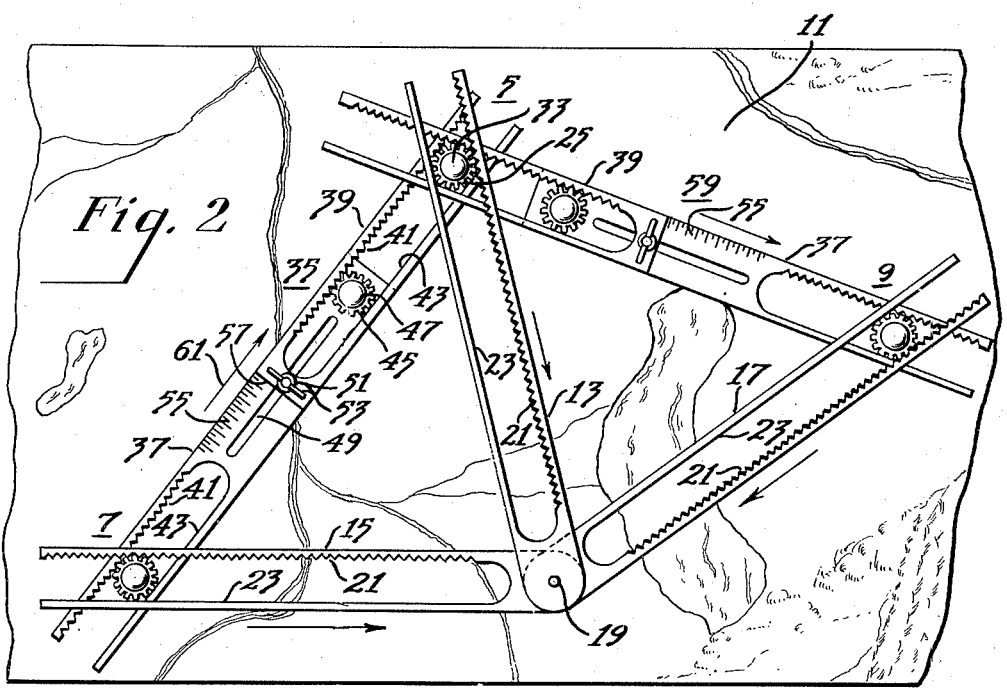
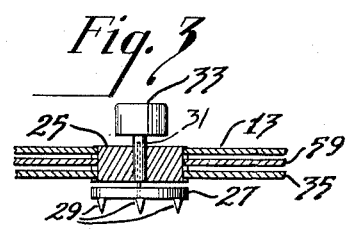
INVENTOR.
Irving Wolff
BY
*CD Tuska*
ATTORNEY Jan. 22, 1952     I. WOLFF     2,583,503
POSITION DETERMINING SYSTEM
Filed Dec. 29, 1945     3 Sheets-Sheet 2

INVENTOR
*Irving Wolff*
BY
ATTORNEY

Jan. 22, 1952         I. WOLFF         2,583,503
POSITION DETERMINING SYSTEM
Filed Dec. 29, 1945         3 Sheets-Sheet 3
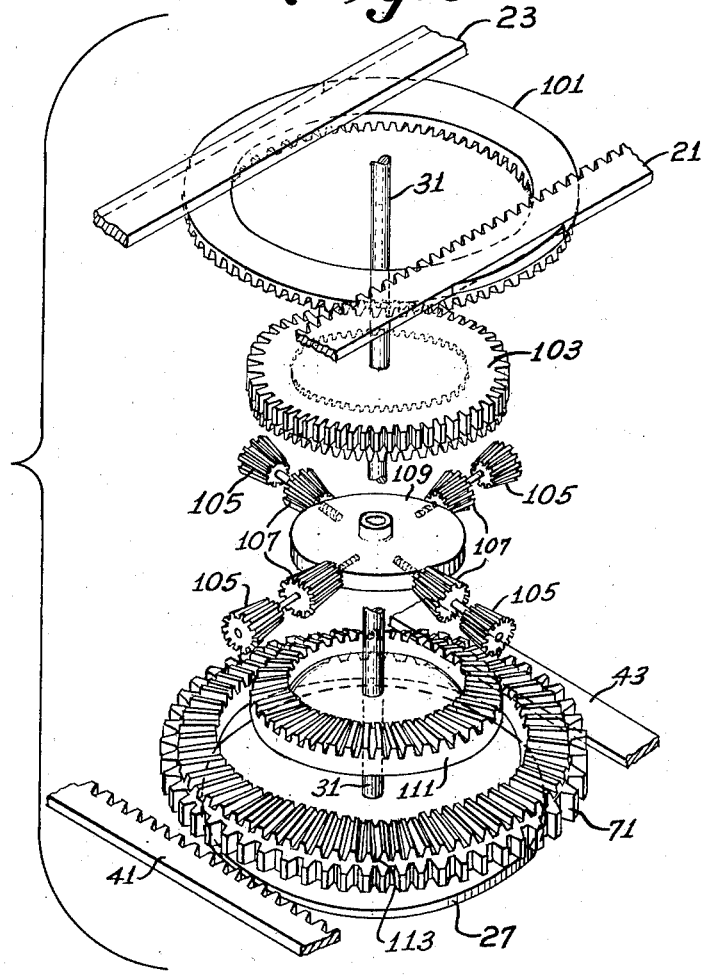
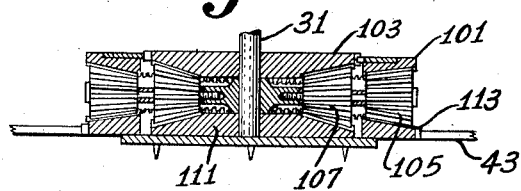
INVENTOR.
*Irving Wolff*
BY
ATTORNEY Patented Jan. 22, 1952

2,583,503

UNITED STATES PATENT OFFICE 2,583,503

POSITION DETERMINING SYSTEM

Irving Wolff, Princeton, N. J., assignor to Radio Corporation of America, a corporation of Delaware Application December 29, 1945, Serial No. 638,385

4 Claims. (Cl. 33—189)

This invention relates to position determining devices and more particularly to systems for plotting and indicating on a map the position of a mobile station by means of measurements based on the relative times required for signals to travel to said mobile station from a plurality of fixed reference stations.

Various systems have been devised for measuring the distance between two stations by radiating a signal from one station to the other, and using the signal received at the second station to radiate a similar signal back to the first station. The signal received at the first station is compared in phase or frequency with the initial signal to provide an indication of the time required for the signal to travel between the two stations, and hence of the distance between the two stations. Thus two or more fixed reference stations may be used, and the position of a mobile station can be determined from measurements of the distances from it to the reference stations.

Under some circumstances, it is desirable to avoid the necessity for transmission from the mobile station. This may be done by using three or more fixed stations, interconnected by synchronizing means so as to transmit signals in timed relationship. These signals are compared at the mobile station, providing information in the form of differences of the wave propagation times (and hence the differences of the distances) from the several fixed stations to the mobile station.

The principal object of this invention is to provide improved systems for computing and indicating the position of a mobile station in accordance with distance difference information.

Another object of the invention is to provide systems of the described type which give a direct indication of position without requiring any calculations to be made.

Figure 4:
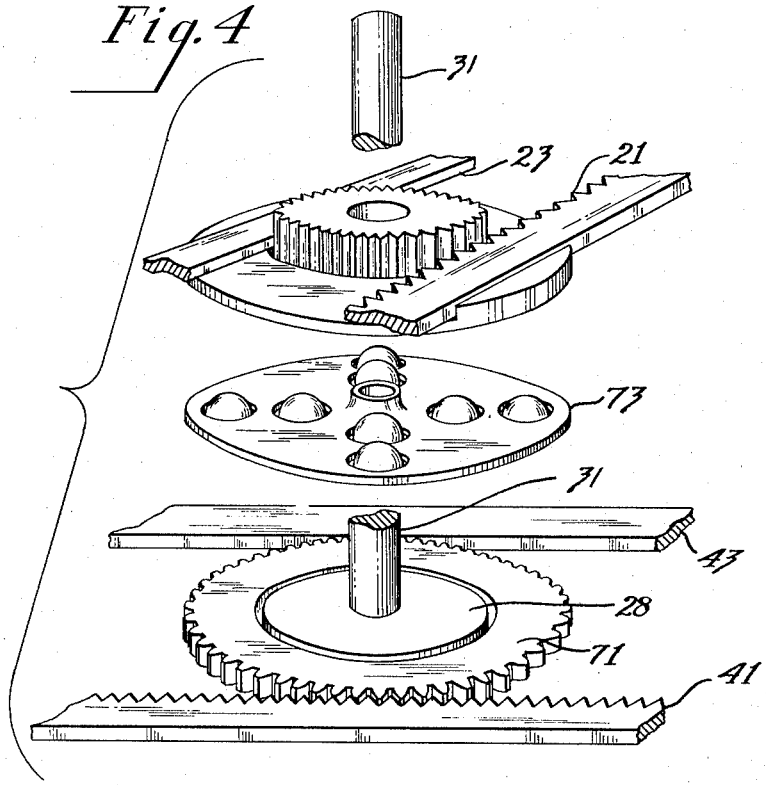
Figure 5:
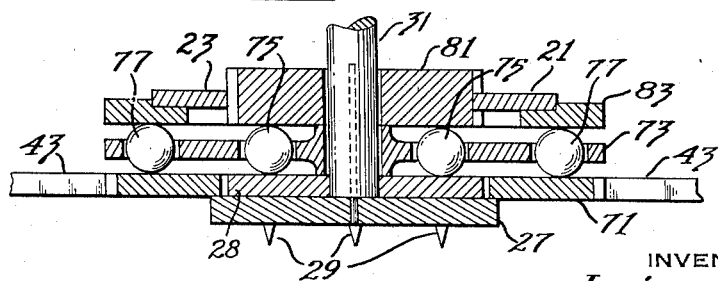

The invention will be described with reference to the accompanying drawings, wherein Figure 1 is a schematic diagram illustrating a typical arrangement of fixed reference stations, Figure 2 is a plan view of a position indicating mechanism embodying the invention, Figure 3 is a sectional elevation of a pivot assembly in the system of Figure 2, Figure 4 is an exploded perspective view of a modified pivot assembly for the system of Figure 1, Figure 5 is a sectional elevation of the structure of Figure 4, Figure 6 is an exploded perspective view of a modification of the structure of Figure 5, and Figure 7 is a sectional elevation of the structure of Figure 6.

Refer to Figure 1. Reference stations 1, 2 and 3 are provided at predetermined locations. Each of the reference stations includes a transmitter arranged to radiate signals bearing predetermined timing modulation, or in predetermined phase relationship to the others. These signals are received at a station carried by a mobile craft 4. The distances of the mobile craft from the stations 1, 2 and 3 respectively are designated R1, R2, and R3. The mobile station includes means responsive to the relative timings of the signals received from the reference stations to provide indications of the distance differences R1—R2 and R1—R3, respectively.

Referring to Figure 2, three pivot assemblies 5, 7 and 9 are placed on a map 11 at points corresponding to the locations of the reference stations 1, 2 and 3 respectively. Each of the pivot assemblies supports slidably a respective one of three radial arms 13, 15 and 17, which are pivotally connected together at a point 19. The arms 13, 15 and 17 are identical, each comprising a toothed rack portion 21 and a guide 23 parallel to the rack. The arm 13 engages a pinion 25 on the pivot assembly 5.

The pivot assembly 5, as shown in Figure 3, includes a base 27 provided with pins 29 suitable for penetrating a map and engaging the surface of a board supporting the map. A vertical shaft 31 is secured to the base 27 and supports rotatably the pinion 25. A knob 33 is connected to the pinion 25 for manual rotation thereof.

The pivot assemblies 7 and 9 are identical with that shown in Figure 3. Referring again to Figure 2, a rack member 35 couples the pivot assemblies 5 and 7. The member 35 is made up of two parts 37 and 39, each including a rack portion 41 and a guide 43. The part 37 supports rotatably a pinion 45, similar to the pinions 25, in engagement with the rack 41 of the part 39. The pinion 45 is connected to a knob 47. A slot 49 is provided in the part 37, for engagement with a screw 51 passing through and supported by the part 39. The screw 51 is provided with a wing nut 53.

The above described arrangement maintains the parts 37 and 39 in longitudinal alignment. Rotation of the knob 47 clockwise increases the overall length of the member 35, and counter clockwise rotation decreases the length. Scale markings 55 are provided on the part 37, and may be read against the edge 57 of the part 39 to indicate the length to which the member 35 is adjusted.

A second rack member 59 couples the pivot assemblies 5 and 9. The member 59 is identical in structure with the rack member 35. The calibration of the scale 55, both on the rack member 59 and on the member 35, may be in units of distance (e. g. miles), or may be in arbitrary numerical units which must be multiplied by a scale factor to conform to the particular map being used.

The adjustment and operation of the described mechanism is as follows:

The difference between the distances R1 and R2 is known, being determined by the difference in the times of arrival at the mobile station 4 of signals transmitted simultaneously from the fixed stations 1 and 2. The length of the rack member 35 is adjusted, by means of the knob 47, to conform to this difference, taking into consideration the scale factor for the map 11. This adjustment drives the pinions 25 of the pivot assemblies 5 and 7 in opposite directions, making one of the arms 13 and 15 run radially outward while the other runs inward. The term "outward" as used herein is intended to describe motion such as to increase the distance from the respective pivot structure 5, 7 or 9 to the common pivot member 19. "Inward" is used to mean the opposite direction. Similarly, the terms "extend" and "extension" refer to outward motion, and "retract" and "retraction" mean inward motion. The difference in their radial extensions corresponds to the difference of the distances R1 and R2. The wing nut 53 on the rack 35 is then tightened to maintain this adjustment.

The knob 33 is then turned, for example clockwise, turning the pinion 25 and moving the rack 35 as a whole in the direction of the arrow 61. This drives the pinion 25 of the pivot assembly 7 clockwise at the same rate as that of the pivot assembly 5, and both radial arms 13 and 15 are driven outward from their respective pivot assemblies. This operation can be carried out as well by moving the rack 35 longitudinally by means of the knob 47, instead of rotating the knob 33.

As the arms 13 and 15 move radially outward, they carry the common pivot 19, causing the arm 17 both to rotate about its pivot assembly 9 and to move radially thereof. Radial motion of the arm 17 rotates the pinion 25 of the pivot assembly 9, moving the right hand part 37 of the rack member 59. The wing nut 53 on this member is left loose, to allow independent longitudinal motion of the two parts 37 and 39. The part 39 of the member 59 moves with the pinion 25 of the pivot assembly 5.

The scale 55 of the member 59 is observed while the above described operation is carried out, and when the indication thereon corresponds to the difference of the distances R1 and R3, the motion of the pinions 25 is stopped. The difference between the radial extensions of the arms 13 and 17 at this time corresponds to the difference between the distances R1 and R3. The point 19 is over the map position of the mobile station 4.

Although it is preferable to operate the device in the manner described above, it is also possible to adjust the lengths of the member 59 directly to the difference of the distances R1 and R3. This will, in most instances, require the member 59 to move longitudinally as a whole while its length is being changed, but the point 19 will be driven as before to the map position of the station 4.

It will be apparent that the location of the mobile station is at the intersection of two hyperbolas, one determined by the positions of the ground stations 1 and 2 and the difference between the distances R1 and R2, and the other determined by the positions of the stations 1 and 3 and the difference between R1 and R3. In the described operation of the system, the first hyperbola is traced by the pivot point 19 as it is moved by the arms 13 and 15. The pivot point 19 is located at the intersection point when the scale 55 in conjunction with the edge 57 of the part 39 indicates that the length of member 59 corresponds to the difference of the distances R1 and R3, and thus satisfying the conditions of the second hyperbola.

It has been assumed in the above description that the area covered by the map 11 is small enough so that great circles are substantially straight lines, so that true distances are shown on the map. Actually, true distances between all pairs of points are shown only on a spherical map. However, this type of error can be minimized and in fact practically eliminated by the proper choice of map projection. Furthermore, maps shaped like a portion of a sphere can be used with the described system, by making the arms curved like great circles.

While the above described system will operate with sufficient accuracy for some purposes, particularly if the diameters of the pinions 25 are small compared to the lengths of the arms and rack members, some error is introduced by the variation in radial extension of each arm as it rotates about its pivot assembly. Thus if the arm 17 rotates a quarter turn about its pinion 25, the extension of the arm 17 will not correspond exactly to the longitudinal position of the part 37 of the rack 59, but will differ from it by one quarter the circumference of the pinion 25.

To eliminate this error, it is necessary to make the radial extension of each arm depend only upon the longitudinal position of the rack portion to which it is geared, and not directly upon the angular position of the arm itself. This is accomplished by a modified pivot assembly shown in Figures 4 and 5, wherein elements corresponding to those of Figures 2 and 3 are designated by corresponding reference numerals.

A pinion 71, similar to the pinions 25 of Figures 1 and 2, is supported rotatably on the base 27 and engages the toothed portion 41 and guide 43 of one or both of the rack members 35 and 59, only one being shown in Figures 4 and 5. A cage member 73 is supported on the shaft 31 above the base 27 and carries a plurality of bearing balls 75 and 77. The balls 75 engage the upper face of a disc shaped plate 29 secured to the base 27, and the balls 77 engage that of the pinion 71.

A second pinion 81 is disposed on the shaft 35, above and having its lower face in engagement with the balls 75. The pinion 81 engages the toothed portion 21 and guide 23 of one of the radial arms 13, 15 and 17. An annular plate 83 surrounds the lower part of the pinion 81 and is provided with guide surfaces engaging the outer surfaces of the radial arm, so that rotation of the arm about the shaft 35 causes the annulus 83 to rotate with it. The lower surface of the annulus 83 engages the balls 77.

In the operation of the device of Figures 4 and 5, rotation of the radial arm, together with its annulus 83, causes the balls 77 to roll between the annulus 83 and the pinion 71. The balls 77 travel around the shaft 35 at half the speed of the annulus 83, carrying with them the cage 73. Rotation of the cage 73 rolls the balls 75 on the plate 28, causing the pinion 81 to rotate on the shaft 35 at the same rate as the annulus 83. Thus the pinion 81 does not rotate with respect to the annulus 83, and the extension of the radial arm is not altered by its rotation around the shaft 35.

Radial motion of the arm is effected by longitudinal motion of the rack member as follows:

Rotation of the pinion 71 by the rack 41 rolls the balls 77 on the bottom of the annulus 83, rotating the cage 73. This rolls the balls 75 on the plate 28, rotating the pinion 81 with respect to the annulus 83 and driving the rack 21 to move the radial arm. This operation can take place concurrently with that of rotation of the radial arm, without either affecting the other.

It will be apparent to those skilled in the art that mechanisms similar to that shown in Figures 4 and 5 may be devised using gear arrangements instead of ball bearings. Figures 6 and 7 show a structure similar to that of Figures 4 and 5, except that bevel gears 105 and 107 are used instead of the balls 77 and 75 respectively. A spider member 109 supports the gears 105 and 107 for rotation on radial axes, and corresponds in function to the cage 73 of Figure 4. Pinion 103 corresponds to the pinion 81 of Figure 5, and is provided with bevel teeth on its lower surface for engagement with the gears 107. A similarly toothed ring 11 corresponds in position and function to the plate 28 of Figures 4 and 5. The members 101 and 113 of Figures 6 and 7 are like the corresponding members 83 and 71 of Figures 4 and 5, but are provided with bevel gear teeth for engagement with the gears 105. The device of Figures 6 and 7 is analogous to that of Figures 4 and 5, and operates in the same way.

Briefly summarizing, the invention has been described as an improved mechanism for indicating on a map the position of a mobile station, using information in the form of the differences of the distances from said mobile station to a plurality of fixed stations. This type of information is conveniently obtained by means of synchronized radio transmitters at the fixed stations, with receiver means at the mobile station and means for comparing the times of arrival of signals transmitted synchronously from the fixed stations.

The described system includes means for describing a hyperbolic trace over a map, with parameters depending upon the measured difference in distances of two of the fixed stations, and means for indicating which point on said trace corresponds to the map position of the mobile station.

I claim as my invention:

1. A system for indicating on a map the position of a mobile station, in accordance with information as to the differences of the distances from said mobile station to three fixed stations, including three pivot assemblies adapted to be placed on a map over the respective locations thereon of said fixed stations, three arms, pivotally connected together at a common pivot point and each pivotally and slidably supported by one of said pivot assemblies, motion transmitting means including a member adjustable in length connecting the first of said pivot assemblies with the second of said pivot assemblies, further motion transmitting means including a second member adjustable in length connecting the first of said pivot assemblies with the third of said pivot assemblies, means in each of said pivot assemblies for translating longitudinal motion of said motion transmitting means to radial extension and retraction of said respective arms, means for adjusting the length of one of said motion transmitting means in accordance with one of said distance differences, means for indicating the length of the other of said motion transmitting means, and means for moving the first of said motion transmitting means longitudinally to simultaneously vary the extensions of two of said arms by like amounts, thereby to determine the extension of the third of said arms and to adjust the length of said other motion transmitting means to conform to the other of said distance differences and thus position said common pivot point over the location on said map of said mobile station.

2. A system for indicating on a map the position of a mobile station, in accordance with information as to the differences of the distances from said mobile station to three fixed stations, including three pivot assemblies adapted to be placed on a map over the respective locations thereon of said fixed stations, three arms, pivotally connected together at a common pivot point and each pivotally and slidably supported by one of said pivot assemblies, motion transmitting means including a member adjustable in length connecting the first of said pivot assemblies with the second of said pivot assemblies, further motion transmitting means including a second member adjustable in length connecting the first of said pivot assemblies with the third of said pivot assemblies, means in each of said pivot assemblies for translating longitudinal motion of said motion transmitting means to radial extension and retraction of said respective arms, means for adjusting the length of one of said motion transmitting means in accordance with one of said distance differences, and means for adjusting the length of the other of said motion transmitting means in accordance with another of said distance differences to vary the extensions of said arms and thus position said common pivot point over the location on said map of said mobile station.

3. A system for indicating on a map the position of a mobile station, in accordance with information as to the differences between the distances from said mobile station to three fixed stations, including three pivot assemblies adapted to be placed on a map over the respective locations thereon of said three fixed stations, three arms, pivotally connected together at a common pivot point and each pivotally supported by one of said pivot assemblies, means for differentially adjusting the extensions of one pair of said arms from their respective pivot assemblies to said common pivot point, and means for differentially adjusting the extensions of another pair of said arms from their respective pivot assemblies to said common pivot point, whereby said common pivot point is driven to a position on said map corresponding to the position of said mobile station.

4. A system for indicating on a map the position of a mobile station, in accordance with information as to the differences of the distances from said mobile station to three fixed stations, including three pivot assemblies adapted to be placed on a map over the respective locations thereon of said fixed stations, three arms, pivotally connected together at a common pivot point and each pivotally and slidably supported by one of said pivot assemblies, motion transmitting means including a member adjustable in length connecting the first of said pivot assemblies with the second of said pivot assemblies, further motion transmitting means including a second member adjustable in length connecting the first of said pivot assemblies with the third of said pivot assemblies, means in each of said pivot assemblies for translating longitudinal motion of said motion transmitting means to radial extension and retraction of said respective arms, and means for adjusting the length of each of said motion transmitting means to adjust differentially the extensions of each corresponding pair of said arms, and thus position said common pivot point over the location on said map of said mobile station.

IRVING WOLFF.

REFERENCES CITED

The following references are of record in the file of this patent:

UNITED STATES PATENTS

| Number | Name | Date |
|---|---|---|
| 1,661,095 | Rowe | Feb. 28, 1928 |
| 2,422,025 | Luck | June 10, 1947 |
| 2,493,786 | Swift | Jan. 10, 1950 |